Patented Dec. 21, 1943

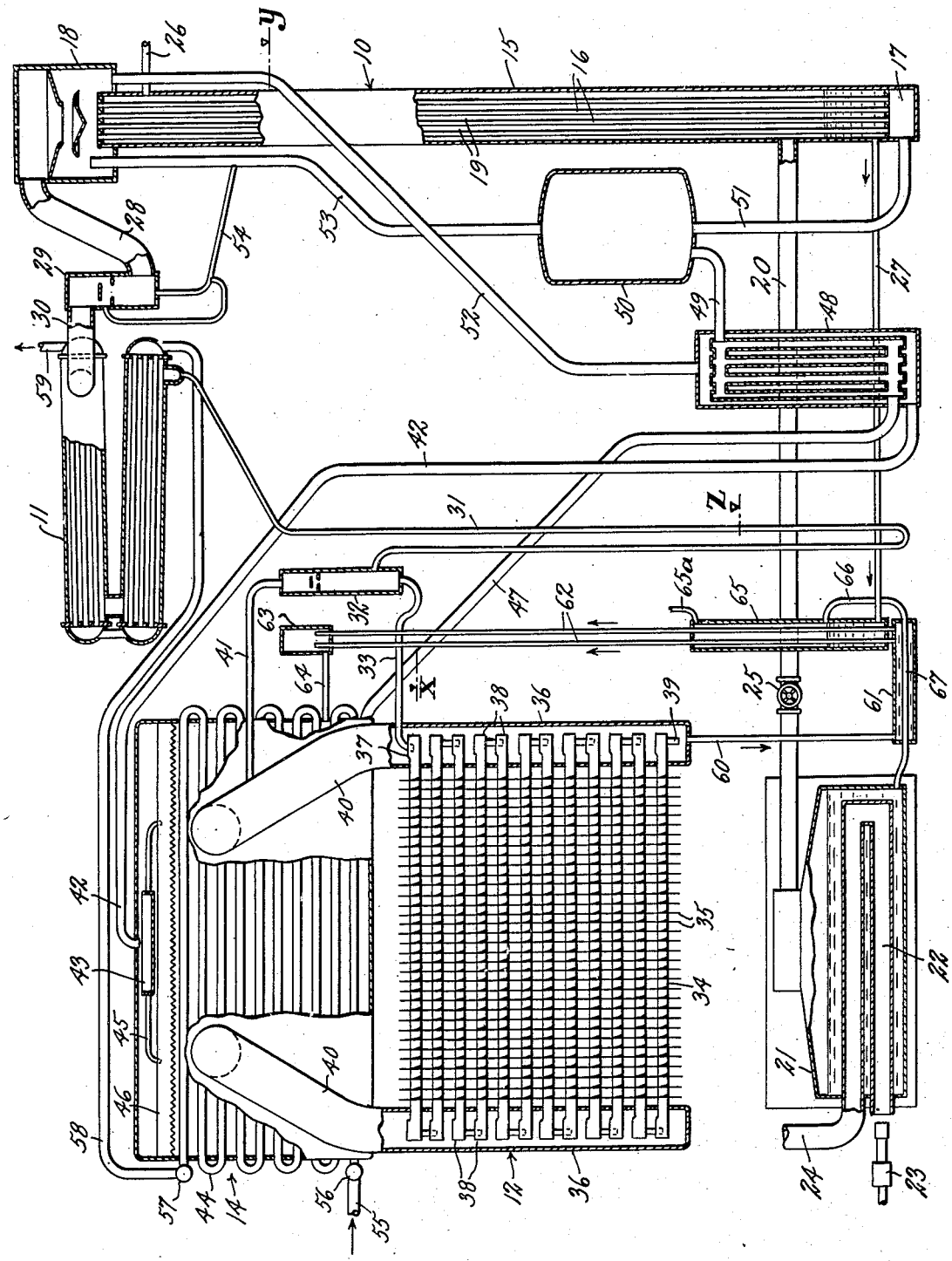

2,337,439

UNITED STATES PATENT OFFICE 2,337,439

REFRIGERATION

Philip P. Anderson, Jr., Evansville, Ind., assignor to Servel, Inc., New York, N. Y., a corporation of Delaware Application August 3, 1940, Serial No. 350,882

8 Claims. (Cl. 62—119)

This invention relates to refrigeration, and more particularly to refrigeration systems of the absorption type.

In absorption refrigerating systems of this kind a liquid refrigerant or cooling agent evaporates in an evaporator with consequent absorption of heat from the surroundings. The evaporated refrigerant passes from the evaporator to an absorber in which the refrigerant is absorbed into liquid absorbent. The absorption solution is conducted in a liquid circuit to a generator in which refrigerant is expelled from absorption solution by heating. The expelled refrigerant is liquefied in a condenser and then returned to the evaporator to complete the refrigerating cycle. The absorption solution from which refrigerant has been expelled is conducted in its circuit from the generator to the absorber to absorb refrigerant vapor.

All of the liquid refrigerant supplied to the evaporator does not always evaporate due to variations in load on the evaporator, so that over a period of time a quantity of unevaporated refrigerant passes through the evaporator. When the evaporator is located below the absorber, provision must be made for returning to the absorption liquid circuit unevaporated refrigerant passing through the evaporator.

It is an object of the invention to provide an improvement in systems of this type for returning to the absorption liquid circuit unevaporated refrigerant passing through an evaporator which is located below an absorber. This is accomplished by raising liquid refrigerant by vapor-lift action from the lower part of the evaporator to a higher level, so that the liquid can be introduced into a part of the system above the liquid level of the absorption solution. The heating of liquid refrigerant for raising the liquid by vapor-lift action is preferably effected by condensed steam returning from the generator to a boiler, the condensed steam being formed at the generator to which the steam is supplied from the boiler for heating the generator.

The invention, together with the above and other objects and advantages thereof, will be better understood from the following description taken in connection with the accompanying drawing, and of which the single figure is a view more or less diagrammatically illustrating a refrigeration system embodying the invention.

Referring to the drawing, the present invention is embodied in a two pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressure and includes a generator or expeller 10, a condenser 11, an evaporator 12 and an absorber 14 which are inter-connected in such a manner that the pressure differential in the system is maintained by liquid columns.

The disclosure in the aforementioned Thomas and Anderson application may be considered as being incorporated in this application, and, if desired, reference may be made thereto for a detailed description of the refrigeration system.

In the drawing the generator 10 includes an outer shell 15 within which are disposed a plurality of vertical riser tubes 16 having the lower ends thereof communicating with a space 17 and the upper ends thereof extending into and above the bottom of a vessel 18.

The space 19 within shell 15 and about the tubes 16 forms a steam chamber to which steam is supplied through a conduit 20 from a boiler 21. The boiler 21 is provided with a heating tube 22 into the lower open end of which is adapted to project the flame produced by a burner 23. While only a single heating tube and burner are illustrated, a number of heating tubes and burners may be employed with the upper open end of each tube connected to a flue or riser 24. The water in boiler 21 is heated by the hot products of combustion passing through the heating tubes 22, thereby producing steam which flows through conduit 20 to generator 10. A suitable hand valve 25 may be provided in conduit 20 to control the flow of steam to the generator.

The space 19 provides for full length heating of riser tubes 16, and a vent 26 is provided at the upper end of shell 15. A conduit 27 is connected to the lower end of shell 15 to return to the boiler 21 condensate formed in space 19, as will be described more fully hereinafter.

The system operates at a partial vacuum and contains a water solution of refrigerant in absorption liquid, such as, for example, a water solution of 40% lithium chloride by weight. With steam being supplied through conduit 20 to space 19 at atmospheric pressure, heat is applied to tubes 16 whereby water vapor is expelled from solution. The absorption liquid is raised by gas or vapor-lift action with the expelled water vapor forming a central core within an upwardly rising annulus of the liquid. The expelled water vapor rises more rapidly than the liquid and the latter follows the inside walls of tubes 16.

The water vapor flows upward through the tubes or risers 16, vessel 18, conduit 28, vapor separating chamber 29 and conduit 30 into condenser 11 in which it is liquefied. The condensate formed in condenser 11 flows therefrom through a U-tube 31, flash chamber 32 and conduit 33 into evaporator 12.

The evaporator 12 includes a plurality of horizontal banks of tubes 34 disposed one above the other and to which are secured heat transfer fins 35 to provide a relatively extensive heat transfer surface. The end portions of the tubes 34 pass into spaced vertical headers 36. The water flows from flash chamber 32 through trap conduit 33 into a liquid distributing trough 37 from which the water flows into the uppermost horizontal bank of tubes 34. The water passes through successively lower banks of tubes through upright open end sections 38 at the ends of tubes 34, whereby shallow pools of liquid are formed in the tubes 34 with excess liquid being discharged at 39 from the lowermost bank of tubes 34.

The water supplied to tubes 34 evaporates therein to produce a refrigerating or cooling effect with consequent absorption of heat from the surroundings, as from a stream of air flowing over the exterior surfaces of the tubes 34 and fins 35. The vapor formed in tubes 34 passes out through the distributing trough 37 and open end sections 38 into the headers 36 which are connected by upwardly extending pipes 40 to absorber 14. To prevent disturbances in evaporator 12 the flash chamber 32 is provided to take care of any vapor flashing of liquid being fed to the evaporator through U-tube 31. The flashed vapor which may form passes through a conduit 41 into one of the pipes 40 and mixes with vapor formed in evaporator 12.

In absorber 14 refrigerant vapor is absorbed into concentrated absorption liquid which enters through a conduit 42. The absorption liquid flows from the upper end of conduit 42 into a liquid receptacle and distributor 43 in which liquid is distributed laterally of a plurality of vertically disposed pipe banks 44 which are arranged alongside of each other. The liquid in receptacle 43 is sub-divided and flows through a plurality of conduits 45 into a plurality of liquid holders and distributors 46 extending lengthwise of and above the uppermost horizontal pipe sections of pipe banks 44.

Absorption liquid siphons over the walls of the liquid holders 46 with drops of liquid falling onto and completely wetting the uppermost pipe sections. Liquid drips from each horizontal pipe section onto the next lower pipe section whereby all of the pipe sections are wetted with a film of liquid.

The water vapor formed in evaporator 12 passes through the headers 36 and pipes 40 into absorber 14 and is absorbed into absorption liquid in the latter. The water vapor absorbed in the liquid dilutes the latter, and the diluted absorption liquid flows through a conduit 47, a first passage in liquid heat exchanger 48, conduit 49, vessel 50, and conduit 51 into the lower space 17 of generator 10. Water vapor is expelled out of solution in generator 10 by heating, and the solution is raised by gas or vapor-lift action in riser tubes 16, as explained above. The absorption liquid in vessel 18 is concentrated since water vapor has been expelled therefrom in generator 10. This concentrated absorption liquid flows through a conduit 52, a second passage in liquid heat exchanger 48, and conduit 42 into the upper part of absorber 14.

The upper part of vessel 50 is connected by a conduit 53 to vessel 18 so that the pressure in vessel 50 is equalized with the pressure in the upper end of generator 10 and condenser 11. Any liquid separated from vapor in separating chamber 29 flows through a conduit 54 into conduit 53 and in the latter to vessel 50.

The heat liberated with absorption of water vapor in absorber 14 is transferred to a cooling medium, such as water, for example, which flows upward through the vertically disposed pipe banks 44. The cooling medium is supplied through a conduit 55 to a horizontal manifold 56 to which the lower ends of the pipe banks 44 are connected. The upper ends of the pipe banks 44 are connected to a manifold 57 to which is connected a conduit 58 through which cooling medium leaves the absorber 14. The conduit 58 is connected to condenser 11 so that the same cooling medium may be utilized to cool absorber 14 and condenser 11, with the cooling medium flowing from condenser 11 through conduit 59 to waste.

The system operates at a low pressure with the generator 10 and condenser 11 operating at one pressure and the evaporator 12 and absorber 14 operating at a lower pressure, the pressure differential therebetween being maintained by liquid columns. Thus, the liquid column formed in tube 31 maintains the pressure differential between condenser 11 and evaporator 12, the liquid column in conduit 47 maintains the pressure differential between the outlet of absorber 14 and generator 10, and the liquid column formed in conduit 42 and connected parts including conduit 52 maintains the pressure differential between the inlet of absorber 14 and generator 10. In operation, the liquid columns may form in conduits 47, 52 and the down-leg of tube 31 to the levels $x$, $y$, and $z$, for example. The conduits are such that restriction to gas flow is effected without appreciably restricting flow of liquid.

The liquid column formed in vessel 50 and conduit 51 provides the liquid reaction head for raising liquid in riser tubes 16 by vapor-lift action. The vessel 50 is of sufficient volume to hold the liquid differential in the system and is of such cross-sectional area that the liquid level therein does not appreciably vary, so that a substantially constant reaction head is provided for lifting liquid in generator 10. The vessel 50 is located below absorber 14 such a distance that, for the greatest pressure differential occurring between absorber 14 and the upper part of generator 10 during operation of the system, the liquid column formed in conduit 47 is below the lower part of absorber 14.

The conduit 52 extends above the upper end of conduit 42 in order that flow of absorption liquid will take place to absorber 14 by gravity and independently of the pressure differential in the system. After the pressure differential in the system has built up and the liquid column in conduit 52 is at the level $y$, for example, and of less height than the liquid column in conduit 42 due to the higher pressure in generator 10 than in absorber 14, gravity flow of absorption liquid still takes place from the upper part of conduit 52 to the inlet of absorber 14.

In accordance with this invention, in order to raise unevaporated refrigerant from the lower part of evaporator 12 to a higher level in the system, the liquid discharged at 39 from the lowermost bank of tubes 34 passes into the upper end of a vertical conduit 60. The lower end of conduit 60 is connected to a horizontal conduit 61 to which in turn are connected a plurality of vertical tubes or risers 62. The upper ends of risers 62 are connected to a vessel 63 from which raised liquid flows through a conduit 64 into absorber 14.

About the lower parts of risers 62 is provided a jacket 65 having a vent 65a to atmosphere and to which is connected the conduit 27 through which condensate flows from generator 10. The condensate flows through conduit 27 into the extreme lower part of jacket 65 and overflows from an intermediate region thereof through a conduit including a vertical portion 66 and a horizontal portion 67 which passes through horizontal conduit 61. The horizontal portion 67 of the conduit through which condensate overflows from jacket 65 is connected to boiler 21 to complete the return path of flow of condensate from the generator to the boiler.

During operation of the refrigerating system the variations in load on evaporator 12 may be such that at times liquid refrigerant evaporates at a rate which is less than the rate at which liquid is supplied to the evaporator, and the unevaporated liquid flows through conduit 60 into horizontal conduit 61. The conduit 61 and conduit 67 extending therethrough constitute a heat exchange device, whereby liquid flowing through conduit 61 is preheated by condensate flowing through the horizontal conduit 67. The preheated liquid enters the lower parts of risers 62 which are heated by condensate entering jacket 65 through conduit 27.

Due to the heating effected by the hot condensate in jacket 65, liquid evaporates in the lower parts of risers 62 to form vapor bubbles whereby liquid is raised or lifted in the risers by vapor-lift action. The risers 62 are sufficiently small so that the vapor bubbles cannot freely pass liquid therein.

It has been found that the condensate returning from generator 10 to boiler 21 is an ideal heating agent for raising liquid from the lower part of evaporator 12. The liquid passing from evaporator 12 into the upper end of conduit 60 may be at a temperature of about 45° or 50° F., for example, and the condensate entering jacket 65 through conduit 27 may be at a temperature of about 180° to 200° F., for example. The condensate supplies a small amount of heat at a relatively high temperature to form sufficient vapor to effect lifting of liquid by vapor-lift action. In the arrangement provided undesirable overheating of liquid in risers 62 is avoided. If overheating of liquid in the risers 62 were effected, only vapor may pass through the risers into absorber 14 with no appreciable lifting or raising of liquid. In such case an additional burden would be imposed on the absorber 14 in that the excess vapor formed in risers 62 due to overheating must necessarily be absorbed into solution. However, in the arrangement provided, a minimum quantity of vapor is formed to effect the necessary lifting of liquid with a major portion of the unevaporated refrigerant being returned in a liquid state from the evaporator 12 to the absorber 14 at the higher level. Under these conditions the additional amount of refrigerant vapor that must be absorbed into solution in absorber 14, as a result of lifting liquid in risers 62 by vapor-lift action, is at a minimum.

In a system of the type described, and particularly when a water solution of lithium chloride is employed in the system, a high concentration of absorption solution must be used which is close to the solidifying point. When the quantity of liquid in parts of the system other than the absorption liquid circuit becomes too great, precipitation of salt crystals takes place with the attendant danger of blocking off flow of liquid in the absorption liquid circuit. For this reason the evaporator 12 and absorber 14 are both arranged to retain a minimum quantity of liquid while performing their necessary functions. In order that variations in the quantity of liquid circulating in the absorption liquid circuit will be kept at a minimum, it is desirable to return as quickly as possible to the absorption liquid circuit unevaporated refrigerant passing out of the lower end of evaporator 12. In the arrangement provided dependable lifting of liquid from the lower part of evaporator 12 is effected with the raised liquid being introduced into an intermediate part of absorber 14 so that it can immediately flow into the absorption liquid circuit.

While a single embodiment of the invention has been shown and described, it will be apparent that modifications and changes may be made without departing from the spirit and scope of the invention, as pointed out in the following claims.

What is claimed is:

1. In a multi-pressure absorption refrigeration sytem, a generator and a condenser adapted to operate at one pressure and an evaporator and an absorber adapted to operate at a lower pressure, connections between the aforementioned parts to provide circuits for circulation of refrigerant and absorption liquid including means to form liquid columns to maintain the pressure differential, said evaporator extending below said absorber, and means for raising against the force of gravity liquid refrigerant passing from a lower part of said evaporator and conducting the raised liquid into the path of flow of the circulating absorption liquid.

2. In an absorption refrigeration system, a generator, an absorber, conduits connecting the aforementioned parts to provide a circuit for circulation of an absorption solution, means to supply steam at substantially atmospheric pressure to said generator to cause expulsion of refrigerant from absorption solution, a condenser for condensing expelled refrigerant, an evaporator, a conduit for conveying liquid refrigerant from said condenser to said evaporator, said conduit being arranged to create a liquid head whereby a reduced pressure exists in the evaporator, means including a vertically extending conduit for conducting liquid refrigerant from the lower part of said evaporator to said absorption liquid circuit, and means for utilizing condensate of said steam at atmospheric pressure to vaporize a portion of said liquid refrigerant at reduced pressure in said vertically extending conduit to thereby effect lifting of said liquid by vapor-lift action.

3. A method of refrigeration which consists in expelling a cooling agent from an absorbent by heat transfer thereto from a heating medium, converting the expelled cooling agent to liquid phase, reducing the vapor pressure ambient to the liquid cooling agent and thereby causing evaporation of the liquid cooling agent to produce a refrigerating effect, carrying out said reduction in vapor pressure by re-absorbing evaporated cooling agent in the absorbent, circulating said absorbent for the purpose of carrying out said absorbing and expulsion steps at different places, the place of absorption being at a lower pressure than the place of expulsion, collecting excess liquid cooling agent at the place of evaporation, and raising such liquid to a higher level by vapor lift action produced by application to the collected liquid of heat residue in said heating medium after use in said expulsion step, and conducting the raised liquid into the path of flow of the circulating absorbent.

4. A method of refrigeration as set forth in claim 3 in which said heating medium is steam which condenses during use in said expulsion step, and said residue heat is in the resulting condensate.

5. A method of refrigeration as set forth in claim 3 in which said evaporating and absorption steps are carried out at a pressure less than atmospheric pressure and less than the pressure at which said expulsion and condensing steps are performed, said cooling agent being water, and said heating medium being steam at atmospheric pressure which condenses during use in said expulsion step, and said residue heat is in the resulting condensate.

6. In an absorption refrigeration system, a generator, a condenser, an evaporator connected to receive liquid refrigerant through a pressure drop from said condenser, an absorber connected to receive vapor from said evaporator, said absorber also being connected with said generator to form a circuit for circulation of absorbent therethrough and therebetween with a higher pressure in said generator than in said absorber, a supply of steam for heating said generator, the steam being condensed while heating the generator, and a device operated by heat from the condensate formed by said heating of the generator, which device is operative to lift liquid from said evaporator upward for flow to said absorbent circuit.

7. An absorption refrigeration system as set forth in claim 6 in which said refrigerant is water, said evaporator and absorber being below atmospheric pressure, and said device is a vapor liquid lift.

8. A refrigeration system as set forth in claim 6 in which said refrigerant is water, the system operating under vacuum conditions, and said steam supply is afforded by a boiler connected to a condenser in heat exchange relation with said generator, the condenser being vented to atmosphere so that the steam supplied thereto is at atmospheric pressure, and the heating of said liquid raising device is by condensate flowing back to said boiler from said condenser.

PHILIP P. ANDERSON, Jr.